April 9, 1946.  P. E. MORTENSEN  2,398,244
APPARATUS FOR MAKING SOCKET WRENCHES
Filed Jan. 24, 1945  2 Sheets-Sheet 1
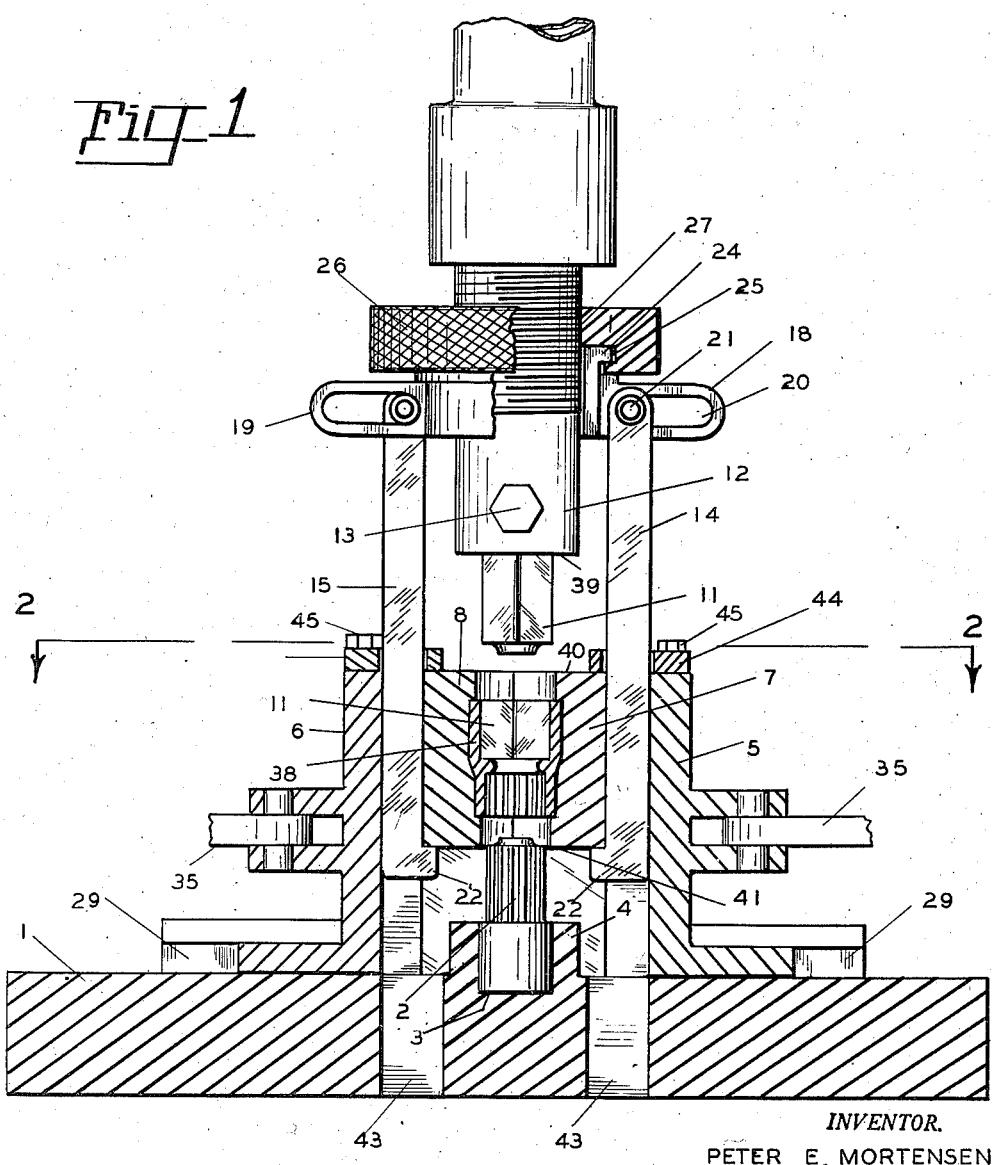
INVENTOR.
PETER E. MORTENSEN
BY Brayton W Richards
ATTORNEY

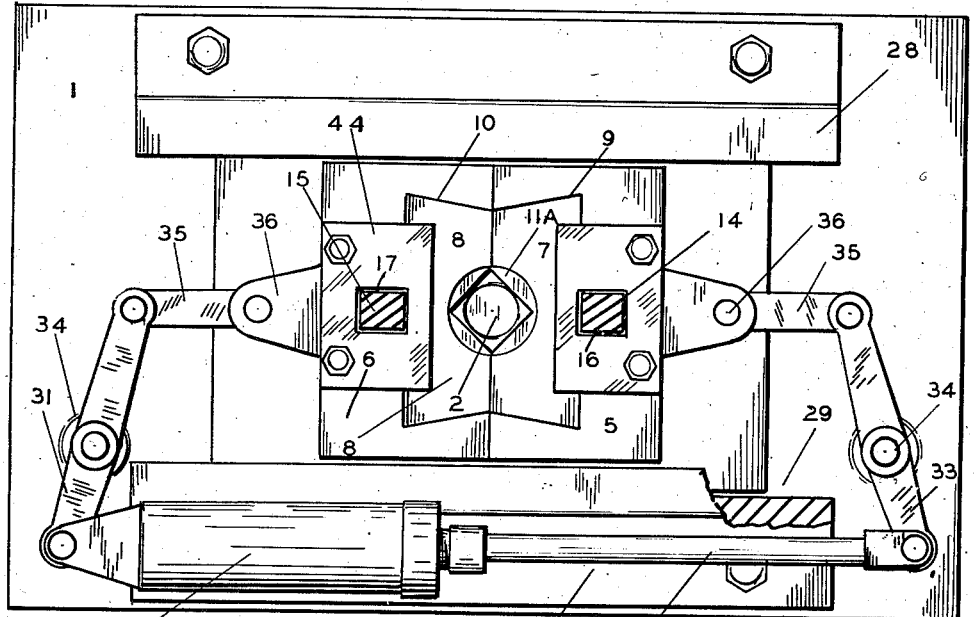
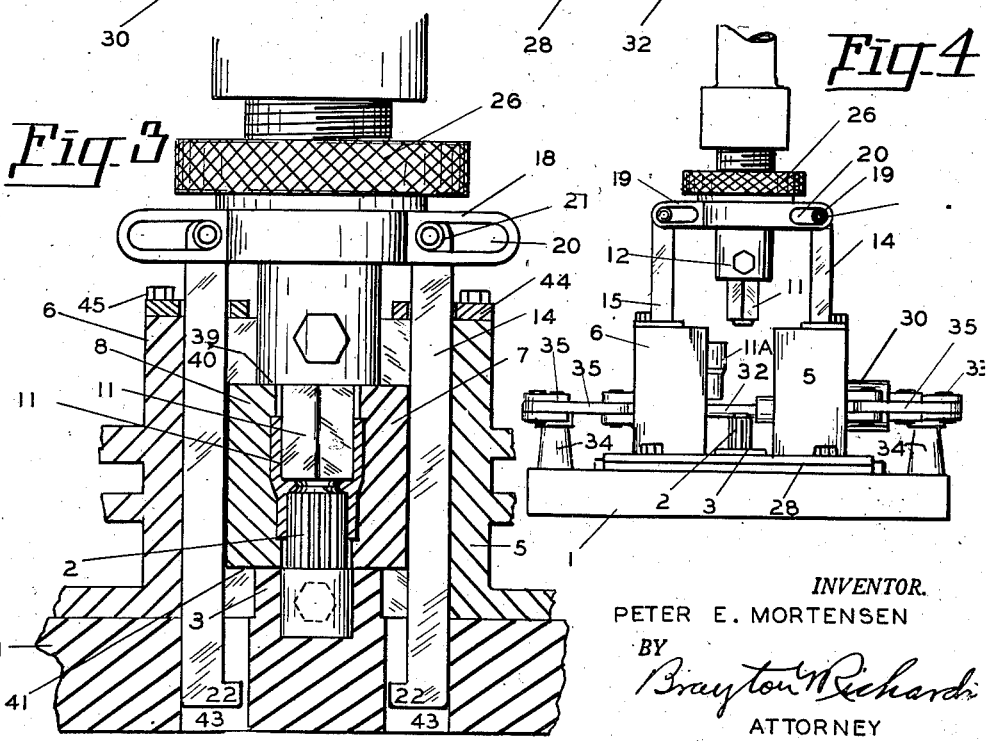

Patented Apr. 9, 1946

2,398,244

UNITED STATES PATENT OFFICE 2,398,244

APPARATUS FOR MAKING SOCKET WRENCHES

Peter E. Mortensen, Milwaukie, Oreg.

Application January 24, 1945, Serial No. 574,398

2 Claims. (Cl. 76—114)

The invention relates to improvements in methods and apparatus for forming socket wrenches and has for its primary object the provision of an improved method and apparatus for the purpose whereby high grade socket wrenches may be economically and efficiently produced.

Other objects will appear hereinafter.

The invention consists of the method and apparatus hereinafter described and claimed.

The invention will be best understood by reference to the accompanying drawings forming a part of this specification and in which—

Fig. 1 is a vertical section of apparatus embodying the invention;

Fig. 2, a horizontal section thereof taken substantially on line 2—2 of Fig. 1;

Fig. 3, a partial vertical section of the apparatus showing the positions of the parts upon completion of their operative movements; and Fig. 4, a side view of the apparatus showing the parts in the positions assumed preparatory to making their operative movements.

The apparatus illustrated in the drawings comprises a base 1 having a lower suitably-shaped male die 2 positioned thereon in a suitable socket 3 on the boss 4 of said base. Die heads 5 and 6 are slideably mounted on the base 1 on opposite sides of the die 2 and are arranged to reciprocate toward and away from said die. The heads 5 and 6 carry female die members 7 and 8 sliding vertically in dove-tailed grooves 9 and 10 which permit of vertical movements of the female die members 7 and 8, as will be readily understood. An upper male die member 11 is secured as shown on a tool holder 12 by means of set screw 13 in cooperative vertical alignment with the lower die member 2, said tool holder 12 being mounted on the lower end of the reciprocating plunger of an ordinary die-operating press or machine. Lifting bars 14 and 15 are slideably mounted within guide openings 16 and 17 in the heads 5 and 6. The upper ends of the lifting bars 14 and 15 are slideably connected with brackets 18 and 19 by means of slot and pin connections 20 and 21. The lower ends of the lifting bars 14 and 15 carry inward projections 22 adapted and arranged to engage the under surfaces 41 of the female die members 7 and 8. The brackets 18 and 19 are carried by a central hub having a flange 24 engaging grooves 25 in the adjusting nut 26 on the punch press and whereby the positions of the lifting bars 14 and 15 may be vertically adjusted as necessary, as will be readily understood. The heads 5 and 6 are slideably mounted in guides 28—29 on the base 1 which permit lateral movements thereof. The heads 5 and 6 are operatively connected with an operating cylinder 30 which is pivotally mounted at one end to the lever 31 and its piston rod 32 pivotally connected with the lever 33 as shown. Levers 31 and 33 are pivotally mounted on the supports 34 and are operatively connected by means of links 35 with lugs 36 on the outer sides of the heads 5 and 6 and whereby the said heads may be moved toward and away from each other as desired.

In operation, female die members 7 and 8 are separated and the upper male die member elevated, as indicated, in Fig. 4 to permit the insertion of a tubular socket wrench blank 38 into cooperative relationship with the male die members 2 and 11. Then the cylinder 30 is operated to close the die members 7 and 8 upon said tubular blank. Then the punch press is operated to lower the male die member 11, forcing the same into the open upper end 11A of the tubular blank and also forcing the tubular blank and the die members 7 and 8 downwardly over the lower male die member 2, thus simultaneously forming both wrench sockets in the blank 38. The lower surface of the tool holder 12 will contact the upper surface 40 of the die members 7 and 8, forcing the same downwardly until their lower surfaces 41 reach the upper surface of the base 1, thereby completing the forming of both ends of the socket wrench as best illustrated in Fig. 3. Then the punch press is operated to elevate the die 11 and the lifting bars 14 and 15, thereby lifting the completed wrench from the lower die member 2 as indicated in Fig. 1. The cylinder 30 is then operated to separate the female die members 7 and 8 and the finished wrench removed therefrom. The openings 43 in the base 1 accommodate the lower ends of the lifting bars 14 and 15, as indicated in Fig. 3, and the stop plates 44 are secured to the upper ends of the heads 5 and 6 by bolts 45 and serve to limit the upward movements of the lifting bars 14 and 15.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. Apparatus for making socket wrenches comprising a base; a male die member mounted on and projecting upwardly from said base; a cooperating male die member mounted above and in alignment with first mentioned die member; means for forcing said upper die member downwardly toward said lower die member; a female die member made in two separable parts embracing the space between said male die members and holding a tubular blank in position for operation thereon by said male die members; means for moving said female die members toward and away from each other to facilitate insertion and removal of tubular blanks; and means operatively connected with the upper male die member arranged to lift said female die members from cooperative relationship with said lower male die member and permit opening and closing movement of said female die members.

2. Apparatus for making socket wrenches comprising a base, two male die members mounted thereon in alignment with each other; means for forcing said die members toward each other; a female die member made in two separable parts embracing the space between said male die members and holding a tubular blank in position for operation thereon by said male die members; means for moving said female die member parts toward and away from each other to facilitate insertion and removal of tubular blanks; and means operatively connected with one of said male die members arranged to move said female die member parts from cooperative relation with the other male die member and permit opening and closing movement of said female die member parts.

PETER E. MORTENSEN.